US011310548B1

(12) United States Patent
Chow et al.

(10) Patent No.: US 11,310,548 B1
(45) Date of Patent: Apr. 19, 2022

(54) MODIFYING EVENT PLAYLISTS

(71) Applicant: Oracle International Corporation, Redwood Shores, CA (US)

(72) Inventors: Simon Chow, San Francisco, CA (US); Mahesh Siddirampura, Bangalore (IN); Suman Gupta, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/318,074

(22) Filed: May 12, 2021

(51) Int. Cl.
*H04N 21/236* (2011.01)
*H04N 21/262* (2011.01)
*H04N 21/239* (2011.01)
*H04N 21/222* (2011.01)

(52) U.S. Cl.
CPC ..... *H04N 21/26258* (2013.01); *H04N 21/222* (2013.01); *H04N 21/236* (2013.01); *H04N 21/2396* (2013.01)

(58) Field of Classification Search
CPC ............... H04N 21/222; H04N 21/236; H04N 21/2396; H04N 21/26258; H04N 21/25891; H04N 21/462; G06F 16/4393; G06F 17/00; G06F 21/10; G01Q 30/0269; G11B 27/105; H04L 65/4084; H04L 67/18; H04L 67/22
See application file for complete search history.

(56) References Cited

U.S. PATENT DOCUMENTS

| | | | | |
|---|---|---|---|---|
| 2003/0130894 A1* | 7/2003 | Huettner | ............ | G06Q 30/0269 705/14.55 |
| 2006/0268667 A1* | 11/2006 | Jellison | ............... | G06F 16/4393 369/30.08 |
| 2012/0278816 A1* | 11/2012 | Agar | .................... | H04N 21/462 719/318 |
| 2014/0101696 A1* | 4/2014 | Stefanik | ........... | H04N 21/25891 725/34 |
| 2016/0065637 A1* | 3/2016 | O'Malley | ............... | H04L 67/22 709/231 |
| 2018/0316447 A1* | 11/2018 | Littlejohn | ............... | G06F 17/00 |
| 2019/0325035 A1* | 10/2019 | Sagui | .................. | H04L 65/4084 |
| 2019/0333283 A1* | 10/2019 | Roveta | ................ | G11B 27/105 |
| 2020/0279027 A1* | 9/2020 | Gould | ..................... | G06F 21/10 |
| 2020/0396315 A1* | 12/2020 | Manj | ...................... | H04L 67/18 |

* cited by examiner

*Primary Examiner* — Le H Luu
(74) *Attorney, Agent, or Firm* — Invoke

(57) ABSTRACT

Techniques are disclosed for organizing and distributing artifacts generated by processing pipelines for the training or application of machine learning models. An application may subscribe to a playlist of a stream of events and locally store a copy of the playlist. The subscriber may merge locally stored and/or selected events to generate a merged stream of events. The subscriber may then execute the merged event stream including the newly added instance of the event.

21 Claims, 5 Drawing Sheets

FIG. 2

- 204 Request subscription to a playlist of a stream of events
- 208 Receive stream of events corresponding to the playlist
- 212 Store local copy of playlist
- 216 Execute local copy of playlist by executing events in stream of events
- 220 Merge local copy of playlist with locally selected events to generate merged playlist/stream of events
  - 224 Identify a first event in stream that has been locally executed
  - 228 Determine that the first event needs to be re-executed
  - 232 Insert new instance of the first event in the local copy of the playlist
    - 233 Remove event(s), reorder events in local copy of the playlist
- 234 Publish merged local copy of playlist
- 236 Execute merged local copy of playlist

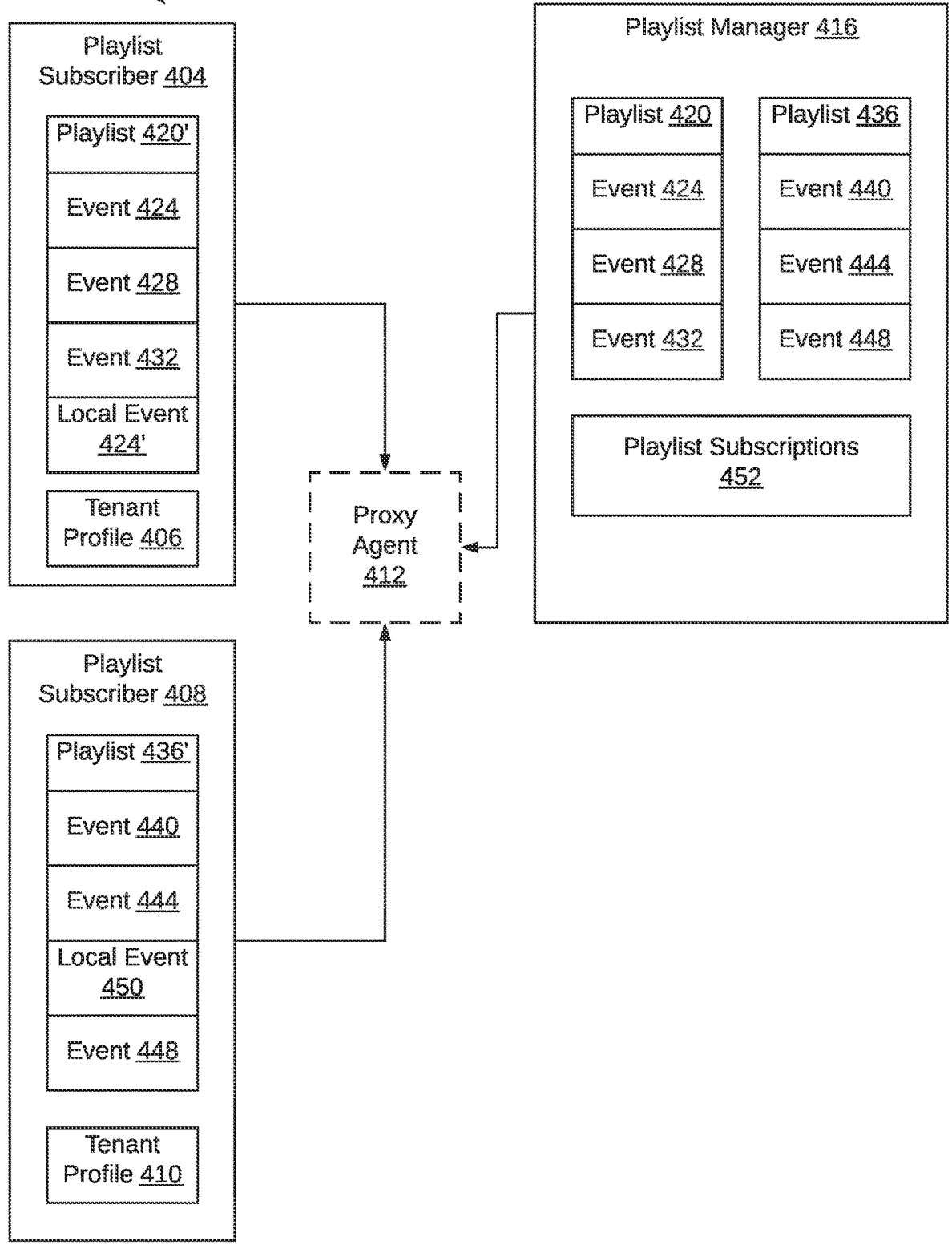

MODIFYING EVENT PLAYLISTS

TECHNICAL FIELD

The present disclosure relates to the manipulation of event streams. In particular, the present disclosure relates to modifying event playlists.

BACKGROUND

Collecting and processing data in an event stream is an increasingly common alternative to, or complement to, more traditional database architectures. An event stream may include a series of events, such as time-indexed or sequentially ordered transactions. Examples of these serial or ordered transactions may include data queries, clickstream data (e.g., webpage requests, webpage renderings, mobile application transactions), changes to variable values as collected by sensors (e.g., temperature data collected from a smart thermostat), and the like. A set or group of these events may be stored, collectively, in a data structure sometimes referred to as a "topic." A topic that includes a set of events may be processed and/or analyzed by one or more applications, which in turn may produce other topics processed and/or analyzed by still other applications. The various analytical processes executed on a topic (or on transformed, successor topics) may be analyzed with more speed and/or convenience than may be commonly found in data structures stored in, for example, structured query language (SQL) databases or other types of databases.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for altering a playlist of events with one or more locally generated events in accordance with one or more embodiments;

FIG. 4 illustrates an example embodiment of a system for altering a playlist of events with one or more locally generated events in accordance with one or more embodiments.

DETAILED DESCRIPTION

Figure 1:
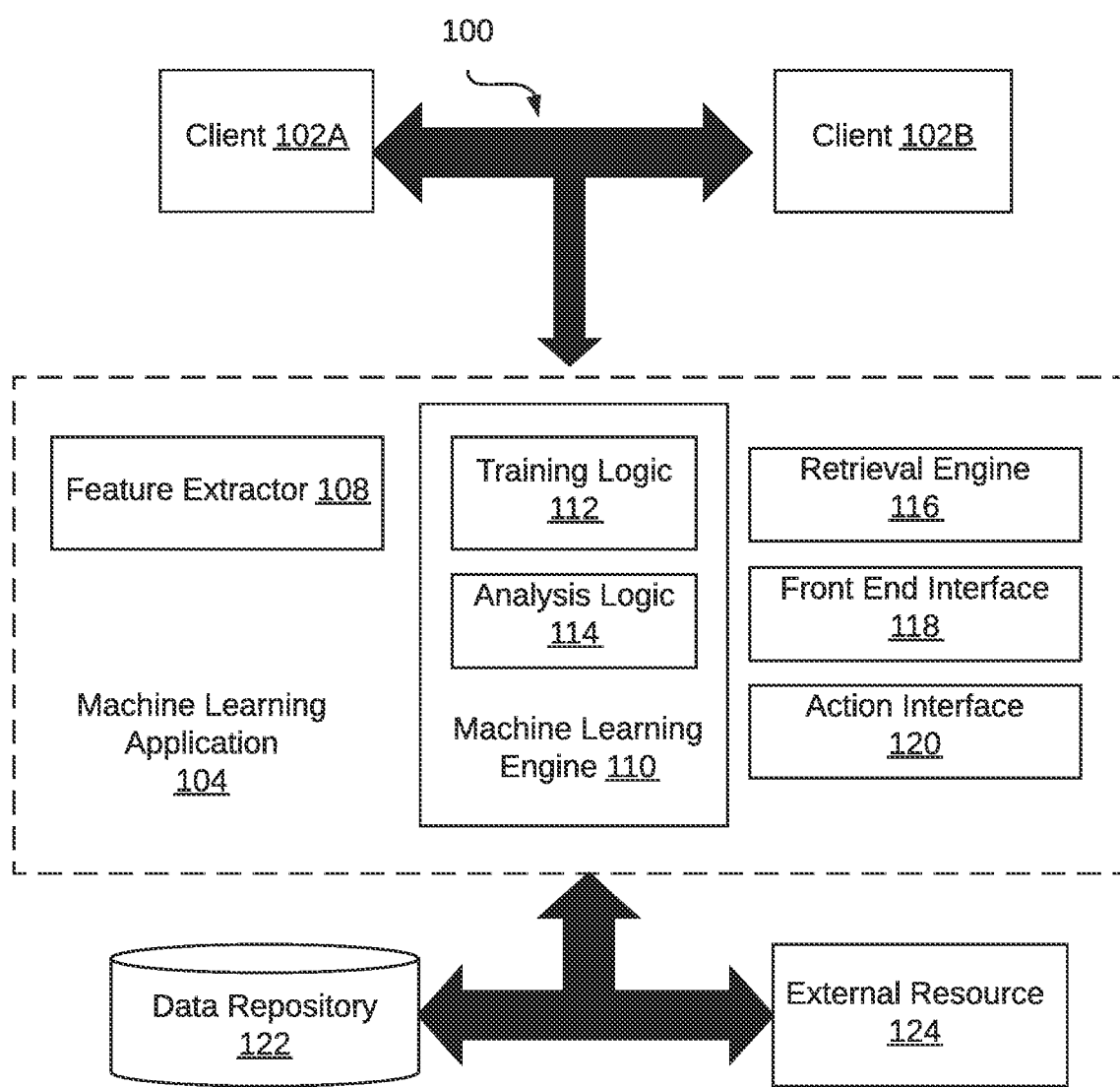
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
    2. SYSTEM ARCHITECTURE
    3. PLAYLIST MODIFICATION
    4. PROXY RETRIEVAL AND MULTI-TENANT DATA PROCESSING
    5. EXAMPLE EMBODIMENT
    6. COMPUTER NETWORKS AND CLOUD NETWORKS
    7. MISCELLANEOUS; EXTENSIONS
    8. HARDWARE OVERVIEW

1. General Overview

One or more embodiments include organizing and distributing artifacts generated for/by processing pipelines for the training or application of machine learning models. More specifically, embodiments may enable a computing application to "subscribe" (e.g., request recurring and/or continuous access to) a playlist of a stream of events. A subscribing application may receive and store the playlist as a copy that is local to the application and distinct from an original or system-stored instance of the playlist. The requesting application may execute a local copy of the playlist by processing, analyzing, or executing processes using the event data. In some embodiments, the system may merge locally stored and/or selected events to generate a merged stream of events. For example, the system may identify a locally executed event in the stream of events and determine that the event needs to be re-executed, locally. Upon determining that the identified event requires re-execution, the system may insert a new instance of the event in the locally stored event stream and then execute the merged event stream including the newly added instance of the event.

One or more embodiments described in this Specification and/or recited in the claims may not be included in this General Overview section.

2. Architectural Overview

One or more embodiments described below include systems and methods that enable the manipulation of repeatably consumable data structures (or more generally "artifacts") that are composed of a series or group of events. More specifically, the embodiments below include aspects that enable a series of events stored as a "playlist" to be repeatedly processed (or "consumed") by one or more computing applications, and also to be adapted and revised by distinct computing applications without altering the originally stored playlist. Conveniently manipulated playlists of events enable, in various examples, events already existing in the playlist to be added to an end of the same playlist or a duplicated instance of an event to be added between pre-existing events of the playlist. In some examples, this feature may enable the system to repeat processing of an event in a playlist to correct an error in processing encountered during the earlier instance of the repeated event. In other examples, new events may be added to a playlist, whether at a beginning of the playlist, at an end of the playlist, or in between. In these examples, the new events added to a playlist may even be locally generated event (e.g., generated by the application, another application, or by a local client system).

In some examples, an originally stored playlist remains unchanged despite repeated consumption and alteration by other computing applications. In some examples, the system may preserve the original or "baseline" playlist by enabling distinct applications consuming the playlist to generate a distinct copy or instance of the playlist that in turn may be altered for the purposes of the requesting application. In other examples, the system may preserve the original or "baseline" playlist by permitting computing application access to a playlist via a proxy service. This proxy service does not permit direct access by a requesting application to the playlist or its events, but rather enables consumption of the playlist by the application without permitting changes to be made to the playlist.

FIG. 1 illustrates a system 100 in accordance with one or more embodiments. As illustrated in FIG. 1, system 100 includes clients 102A, 102B, a machine learning application 104, a data repository 122, and external resource 124. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B may be configured to transmit instructions, data, queries, and/or various other types of transactions to the ML application 104 (e.g., for analysis). For example, one or more of the clients 102A, 102B may transmit events (e.g., data items, analysis instructions), playlists (e.g., a series of events, whether data items and/or analysis operations) and the like to the ML application. One or more of the clients 102A, 102B may "subscribe" to playlists of events. That is, the clients 102A, 102B may transmit a request to the ML application 104 to execute one or more analysis pipelines and/or transmit a set of one or more data items for local analysis.

The clients 102A, 102B may also include a user device configured to render a graphic user interface (GUI) generated by the ML application 104. The GUI may present an interface by which a user may subscribe to a playlist, transmit data items and/or analytical results stored locally to the ML application 104, and the like. In some examples, the GUI may include features that enable a user to view data items and/or analytical results. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate, thereby further revising or validating training data. This latter feature enables a user to label target data analyzed by the ML application 104 so that the ML application 104 may update its training.

In some examples, the clients 102A, 102B may represent distinct tenants of a multi-tenant system that are both in communication with the machine learning application 104. In some embodiments, the data and transactions associated with the client/tenant 102A is maintained separately from the data and transactions associated with the client/tenant 102B. In other examples, described below, the client/tenants 102A/102B may selectively contribute data to a common pool of data used to train the machine learning application 104. Because this pooled data set may be larger and more diverse than any individual data set associated with an individual tenant, the machine learning model trained using this pooled data may generate more accurate and more precise predictions.

Turning now to the machine learning (ML) application 104, this component of the system 100 may be trained to execute various analyses on data items using the "playlist" architecture described herein. For example, the ML application 104 may be trained to execute one or more of a series of sequential analyses to predict results on a playlist of data items. In some examples, the sequential analyses may actually have staggered starts so that a trained first model within the ML application 104 analyzes a first playlist and a second model within the ML application 104 analyzes the output (or "consumes") of the first model before the first model has reached an end of the first playlist.

The machine learning application 104 includes a feature extractor 108, a machine learning engine 110, a retrieval engine 116, a frontend interface 118, and an action interface 120.

In some examples, the machine learning (ML) application 104 is configured to receive training data. As a part of training and/or once trained and applied to target data, the ML application 104 may execute one or more analyses on target data arranged in a "playlist." As described above, the ML application 104 may in fact execute a series of analyses on related playlists, in which the output of one trained ML model is stored in an output playlist that is further processed by another trained model. This process may be replicated so that a first playlist is successively transformed into corresponding successor playlists of transformed events upon the operation of a set of different trained ML models. This process may continue until a final trained ML model produces a recommendation, prediction, or analytical result.

In some examples described herein, the system may permit generation of different versions of a playlist that incorporate specific alterations to the sequence of events in the playlist. In this way, the system advantageously enables a single playlist that is used by different "consuming" ML models to be modified without altering the original events (e.g., data and/or processed data) in the original playlist. For example, different applications may request a same set of playlists. In this way, different trained ML models corresponding to the different applications may use the playlists in the set as starting points to generate corresponding recommendations and/or output. In some examples, a consuming application may cause a copy of one or more of the playlists in the set to be copied and altered so that a locally stored version of a playlist is adapted for the particular purpose of the consuming application.

In various illustrations of the alterations that an application may perform on one or more playlists, one or more events may be appended to an end of a playlist, added to a beginning of a playlist, and/or inserted between existing events in a playlist. In various examples, any of the changes to a playlist may be performed on a replicated version of the original playlist. In some examples, the replicated playlist is stored local to the application. In other examples, the replicated playlist may be stored in a common data repository (e.g., in a same memory structure as the original, unmodified playlist) but with a designation or permission that restricts access to the playlist to the modifying application. By preserving an original version of a playlist and designating copies of the playlist as editable by an application, an application (or applications) may (repeatedly) access an unaltered version of the original playlist.

Turning now to the various example elements of the ML application 104, the feature extractor 108 may be configured to identify characteristics associated with data items. The feature extractor 108 may generate corresponding feature vectors that represent the identified characteristics. For example, the feature extractor 108 may identify event attributes within training data and/or "target" data that a trained ML model is directed to analyze. Once identified, the feature extractor 108 may extract characteristics from one or both of training data and target data.

The feature extractor 108 may tokenize some data item characteristics into tokens. The feature extractor 108 may then generate feature vectors that include a sequence of values, with each value representing a different characteristic token. The feature extractor 108 may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only. Other types of models may be used for tokenizing characteristics.

The feature extractor 108 may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) for one or more characteristics of a set of characteristics described by a feature vector. In some examples, a label may indicate a certain type or class that is associated with a vector. In some examples, a label may indicate an accuracy or relevance of a prediction or analysis provided by the ML model related to a vector (e.g., as used in a supervised learning context).

As described above, the system may use labeled data for training, re-training, and applying its analysis to new (target) data.

The feature extractor 108 may optionally be applied to target data to generate feature vectors from target data, which may facilitate analysis of the target data.

The machine learning engine 110 further includes training logic 112, and analysis logic 114.

At a high level, the machine learning (ML) engine 110 is configured to automatically learn, via the training logic 112, analysis of data items stored as a set of events in a playlist of events. The trained ML engine 110 may be applied to target data (also organized as events within a playlist), thereby generating an analytical result (e.g., a prediction or recommendation) associate with the target playlist. Example techniques used to manipulate, modify, alter, and/or analyze playlists and events are described below in the context of FIGS. 2 and 3A.

Types of ML models that may be associated with one or both of the ML engine 110 and/or the ML application 104 include but are not limited to linear regression, logistic regression, linear discriminant analysis, classification and regression trees, naïve Bayes, k-nearest neighbors, learning vector quantization, support vector machine, bagging and random forest, boosting, backpropagation, neural networks, and/or clustering.

In some examples, the training logic 112 of the ML engine 110 receives a set of data items as input (i.e., a training corpus or training data set). Examples of data items include, but are not limited to, electronically rendered documents and electronic communications. Examples of electronic communications include but are not limited to email, SMS or MMS text messages, electronically transmitted transactions, electronic communications communicated via social media channels, clickstream data, and the like. In some examples, training data used by the training logic 112 to train the machine learning engine 110 includes feature vectors of data items that are generated by the feature extractor 108, described above. Examples of electronically rendered documents include structured and non-structured documents (ADOBE® PDF®), editable text files (e.g., MICROSOFT® WORD® or files with a .txt file extension), images (e.g., files with a .gif, .jpeg, .tiff file extension) and the like.

The training logic 112 may be in communication with a user system, such as clients 102A, 102B that may include an interface used by a user to apply labels to the electronically stored training data set.

The analysis logic 114 applies the trained machine learning engine 110 to analyze target data, such as a target playlist (that is formed of a set or sequence of target events). The analysis logic 114 may analyze a playlist of events using a trained ML model. Furthermore, in some embodiments, the ML engine 110 may actually include a set of multiple trained ML models (e.g., multiple and separately trained individual instances of the analysis logic 114). As described herein, these may be applied in a series so that an output of one trained ML model may be further processed by a subsequently executed ML model. The final ML model produces a recommendation or prediction in response to a triggering query or instruction that initiated the multi-model analysis.

In some examples, the analysis logic 114 may include facilities for natural language processing so that language-based characteristics (or equivalently, features) of events and/or playlists in target data and training data may be identified regardless of differences in wording. Examples of natural language processing algorithms that the analysis logic 114 may employ include, but are not limited to, document term frequency (TF), term frequency—inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

In some examples, once the analysis logic 114 identifies characteristics in target event data and corresponding characteristics in training event data, the analysis logic 114 may determine a similarity between the target event data characteristics and training event data characteristics. For example, the analysis logic 114 may execute a similarity analysis (e.g., cosine similarity) that generates a score quantifying a degree of similarity between target data and training data. One or more of the characteristics that form the basis of the comparison between the training data and the target data may be weighted according to the relative importance of the characteristic as determined by the training logic 112. In another example, such as for a neural network-based machine learning engine 110, associations between data items are not based on a similarity score but rather on a gradient descent analysis sometimes associated with the operation of neural networks.

In some embodiments, the ML application 104 includes a retrieval engine 116. In some examples, the retrieval engine receives requests (e.g., from a "consuming" application via a client 102A, 102B) to access one or more playlists, and/or execute or otherwise engage an analysis of one or more playlists. To preserve a known and unaltered state of a requested playlist and its constituent events, the retrieval engine 116 may provide a requesting application with the requested playlist while preventing the application from directly accessing the stored playlist or its events. In some examples, the retrieval engine 116 may duplicate the requested playlist and transmit the duplicate to the requesting application. In other examples, the retrieval engine 116 may duplicate the requested playlist and store it in a designated execution environment (e.g., within the retrieval engine 116 itself, within external resource 124) for use by the requesting application. In other examples, the execution environment may be within the environment in which the playlist is stored, with the transmissions to and from the requesting application mediated by the retrieval engine 116 to prevent any unauthorized alteration of the original playlist. The retrieval engine 116 and its operations may be equivalently referred to as a "proxy service" and/or "proxy retrieval" or "proxy transactions."

In some embodiments, the ML application 104 may be associated with a multi-tenant environment in which multiple tenants may access a set of trained ML models (e.g., in the ML engine 110) and/or a set of playlist and events. In some embodiments, the retrieval engine 116 may manage permissions and tenant profiles associated with various tenants.

In some cases, tenants may permit data stored and produced within and/or by their tenancies to be shared with the training logic 112. The retrieval engine 116 can determine whether a tenant permits this sharing and what types of data from a particular tenant may be shared. If permitted, the retrieval engine 116 may retrieve the permitted data from a tenant and provide it to the training logic 112. In this way, the retrieval engine 116 may mediate the transfer of data from multiple tenants to an ML model used by the multiple tenants in order to increase a training data set that may result in a more sophisticated and more powerful trained model.

If a tenant changes a permission, thereby restricting future data sharing, the retrieval engine 116 may also apply the permission changes to prevent any prohibited sharing. The retrieval engine 116 may perform this regulatory function by using techniques described in more detail in the context of FIG. 3B.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface related to analysis of a target data item in light of a playlist or playlists. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

In some embodiments, the machine learning application 104 may access external resources 124, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 6, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

Information related to target data items and the training data may be implemented across any of components within the system 100. However, this information may be stored in the data repository 122 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Playlist Modification

FIG. 2 illustrates an example set of operations, collectively referred to as a method 200, for modifying a locally stored instance of a playlist with locally stored events, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The method 200 may begin by the system requesting a subscription to a first playlist comprising a first plurality of events (operation 204). Embodiments of a playlist may include a data structure that stores sequential data events.

One example of a playlist and its corresponding events is that of time-based (or sequentially indexed) events that are associated with one another. In some examples, the playlist data structure represents a stream of events because the events may be sequentially arranged relative to one another. That is, the events may span a variety of different transaction types and/or be related to a variety of different data types. Examples of events in one type of playlist include sequentially related data items. Embodiments of sequentially related data items include, but are not limited to, data objects, data records, instructions implementing changes in data record values to be made to a pre-existing (stored) data record, time-series data, and the like. Examples of events in another type of playlist include vector representations of sequentially related data items.

Examples of events in still another type of playlist (that of a processing pipeline or workflow) include operations, analyses, or processes to be executed on a playlist of data items. Embodiments of a processing pipeline playlist include a set of sequentially arranged algorithms that operate on a corresponding events in a playlist of data items. Still another type of playlist may include events, each event of which is a vector representation of a data item. For example, events that are algorithms in first playlist may operate on corresponding data item events in a second playlist, thereby producing a third playlist of vector events, where each vector event is a representation of a corresponding non-vector data item event in the first playlist.

As illustrated above, some playlists and their corresponding events may be accessed and operated on by other playlists and/or computing applications to transform a first playlist of events from one object type or data type into another object type or data type. That is, playlists may be successively operated on, analyzed and/or transformed multiple times to produce a desired result playlist. In some examples this successive processing is referred to as a "processing pipeline." In some examples, a result playlist includes vector representations of data items or transformed versions of data items (e.g., converted to an alternative data type or data representation structure). In other examples, a result playlist includes transformed data produced by the operation of one or more applications and/or algorithms (e.g., machine learning, doc-to-vec) playlists.

Examples of an association by which a playlist is generated include those that generate events (e.g., data transactions/updates) from a common source, a common computing application, a common webpage, a common transaction/data type, and/or a common entity (e.g., a business or organization). The associated transactions may be collectively grouped together and stored as a playlist. As described below, a playlist of associated events may then be processed by one or more ML applications, thereby generating an analysis that interprets the data (e.g., via a query or real-time data trend monitoring) and/or a prediction. Furthermore, as described below, a playlist may be accessed by different computing applications (and any corresponding processing playlists), and in some cases accessed repeatedly by the different applications.

In some embodiments, the system may prevent alteration to playlists stored in a location that enables communal access by multiple different computing applications. This provides a known and unaltered "baseline" playlist that the different computing applications may access over time. This prevents data mutations in a playlist that could cause analytical aberrations in the various computing applications, particularly when multiple different applications may access, and possibly change, events. In some examples described below, a consuming application may duplicate (or receive a duplication of) a requested playlist and store the received duplicate playlist in a memory structure that is accessible to, and processable by, the requesting application (i.e., "local" storage). The requesting application may then alter the locally stored playlist by adding new events to the playlist, altering an order of events in the playlist, duplicating individual events and merging them into the playlist at various locations in the playlist, among other alterations. In this way, the requesting application may modify the playlist, adapting it for its own analytical purposes, without causing a change to the baseline playlist that remains accessible to other applications.

One specific illustration of a playlist and its corresponding events includes a series of data transactions generated by clickstream data and stored in a collective group. Examples of events may include webpage requests, updates to a shopping cart associated with a user account, changes to a user profile, purchases, returns, and the like. Other examples of event data include changes to streamed sensor data, such as data transmissions associated with changes in temperature, humidity, or manufacturing process conditions.

In some examples, a "subscription" to a playlist is requested by a "consuming" computing application so that the playlist and its events are continuously or periodically provided to the application. That is, a subscription is a standing request by which an application requests a transmission by the system of events associated with the playlist. In this way, a subscribed application is updated continuously or periodically with new events or altered events of the playlist. In other words, the subscribed application receives the playlist without sending repeated queries for the playlist. While many examples herein refer to a computing application as the subscriber, more generally a subscribed user of a playlist may also include a program, algorithm, a system, or other computing structure.

In one illustration, a subscription to a playlist that is comprised of a stream of events may be made by a computing application analyzing real-time clickstream data from an e-commerce website. In this illustration, the playlist is a time ordered sequence of webpage transactions. The webpage transactions are the "events" that are the individual constituents of the playlist. Example events may include, for successive units of time (e.g., 10 milliseconds (ms), 100 ms, 1 second, 1 minute), unique page request (e.g., from unique users), page refreshes (from a current user), product selections (i.e., placing an object in a "shopping cart" of the webpage), a number of purchase events, an average dollar amount per purchase, and the like.

Continuing with the method 200, the subscribed application, receives the stream of events corresponding to the playlist (operation 208). In some examples, the playlist stream of events is transmitted by the system as the system receives the event data. In some examples, a subscribed application receives data that are organized into events by the system into successive instances of a particular unit of time. A sequential transmission of these events may thus form the playlist received by the subscribed application. In some examples, the system organizes a data stream by assembling received data into events and then into a corresponding playlist, which the system then transmits as a copy.

The subscribed application may then store a local copy of the stream of events that form the playlist to which the application has subscribed (operation 212). As indicated above, the "local" copy of the playlist may be logically local to the application in that the playlist is stored in a memory structure to which the application has access but to which access by other computing facilities is partially or wholly restricted. In some examples, the local copy of the playlist is stored in a multi-tenant data storage system where access to the local copy of the playlist is restricted by permission. In other examples, the local copy of the playlist is stored in a logically separate memory structure that is accessible by the subscriber alone.

Regardless of how access to the local copy is restricted or where the local copy of the playlist is stored (e.g., in a local memory cache, in a distributed memory architecture), the subscribing application may access, revise, alter, process, and/or execute the local copy of the playlist. In this way, a subscribing application may alter the playlist (and/or its constituent events) without altering the "baseline" playlist as originally received by the system prior to transmission to the subscribing application.

Once stored as a local copy, the subscribing application may execute the locally stored copy of the playlist by executing the constituent events in the stream of events forming the playlist (operation 216). In some examples, executing the events in the playlist may include consuming data in a data object event playlist and/or a data representation (e.g., vector) event playlist by causing one or more trained ML models to analyze the events. This analysis may cause the system to generate a result playlist in which predictions, analytical results, or other characterizations of the locally stored playlist are represented by corresponding events in the result playlist. In another example, executing the events in the playlist may include transforming data object events into corresponding vector representations by applying a vector-generation algorithm (e.g., doc-to-vec) to the data object events.

The subscriber may then generate a merged playlist by modifying or otherwise altering the locally stored playlist with locally stored events (operation 220). As indicated above, the subscriber may generate the merged playlist so that the subscribed playlist is adapted for the subscriber's own analytical purposes without mutating or corrupting the original form of the playlist. This enables other application or subscribers to receive the playlist in the original form of the playlist, thereby assuring data stability. Furthermore, other subscribing applications may execute corresponding individual instances of the method 200, thereby modifying their own respective local copies of a playlist.

In various examples, the subscriber may generate a merged playlist via any of a number of modifications (operation 220). For example, the subscriber may add additional events to the playlist. An example of an additional event includes one or more duplicated instances of an event (or events) already in the local version of the playlist. These additional events may be placed in a location of the playlist that is different from the original instance of the event. In other examples, an additional event may be a new, "local" event that is accessible by or generated by the application and that does not correspond to an event already in the playlist. In still other examples, the additional event may be a duplicated instance of an event already in the playlist that the application has modified, such as by altering a field value, vector label, or the like.

The subscribing application may place an additional event at a beginning of a playlist (e.g., as a first event in the playlist), at an end of a playlist (e.g., as a last event in the playlist), or in between existing events of the playlist (e.g., between a first event and a last event in the playlist).

In other examples, the subscribing application may remove (or delete) events from the playlist so that the merged playlist actually includes fewer events than the original "baseline" playlist. In still other examples, the subscribing application may alter data in one or more events, as indicated above (e.g., a vector label, a field value in a data object), without changing a sequence or number of events in the playlist. In still other examples, the subscribing application may alter an order of events in a playlist. Any one or more of these alterations may be implemented together in any combination.

Returning more specifically to the example of the method 200 illustrated in FIG. 2, a subscribing application may identify an event in the playlist (equivalently, "event stream") that has been locally executed in the operation 216 (operation 224). For example, the system may identify that a particular data object event has been processed by operation of a vector on the data object event. Analogous examples will be apparent in light of the description of the operation 216.

The system may then determine that the locally executed event needs to be re-executed (operation 228). For example, the system may detect an error in the local execution of the event. The system may determine that the locally executed event will require re-execution to ensure data integrity and data accuracy of the resulting playlist. In some embodiments, the event itself may be incorrect. In some embodiments, field values within the locally stored event may not be accurate. In other embodiments, the execution itself may be flawed. Illustrations of these other embodiments may include interrupted performance of algorithm consuming the event, an inaccurately or improperly trained ML model that consumes the otherwise accurate event to produce an inaccurate result, or other similar embodiment.

Responsive to determining that the event needs to be re-executed, the system copies the improperly executed event and inserts a new instance of this event into the playlist for re-execution (operation 232). This insertion may be equivalently described as "merging" an event into the playlist. As described above, the new instance of the faulty event may be appended to an end of the playlist, added to a beginning of a playlist, or inserted between existing events anywhere between the beginning and end of the playlist.

Furthermore, other embodiments may include the system inserting more than one local event copy into the playlist. In some examples, multiple locally stored events may be inserted into the playlist. In some examples, these multiple local events are inserted individually and non-consecutively into the playlist. In other examples, multiple consecutive local events may be added into the playlist to form the merged playlist. In this latter example, the system is in effect merged two discrete playlists together.

In still other embodiments, the operation 232 may include removing one or more events (e.g., the first event), and/or removing one or more other events in the playlist (operation 233). In other embodiments, the system may reorder the events in the local copy of the playlist (operation 233). Any of these types of operations may be performed alone or in combination with each other and/or the insertion of a new instance of the first event described above in the context of the operation 232.

In some examples, the system may publish the merged local copy of the playlist so that the merged local copy is accessible by other computing applications (operation 234). In one embodiment, the subscriber may transmit the merged local copy to a proxy service or an original publisher of the original playlist with request to add the merged copy as a new version of the original playlist. A benefit of such an arrangement is that subscribers may identify and correct errors in the original playlist and then make a corrected playlist available for consumption by other subscribers.

Once the new instance of the event has been inserted, the method 200 continues by executing the merged playlist (operation 236). Any of the preceding descriptions of executing a playlist may be applied to the operation 236. Executing the merged local copy of the playlist in the operation 236 enables the system to correct any deficiency created by the earlier execution of the playlist (e.g., in the operation 224).

For example, if execution of the playlist generated an error with a particular event that was appended to an end of the merged playlist, the second instance of the particular event may produce an error-free result. The system may then use this error-free result to correct a result playlist produced by execution of the merged local copy of the playlist.

Furthermore, as described above, the operations of the method 200 effect the local copy of the playlist. An original, unaltered "baseline" form of the playlist may be accessed by other subscribers.

4. Proxy Retrieval and Multi-Tenant Data Processing

In some examples, the system may include a proxy retrieval feature. This feature is briefly described above in the context of the retrieval engine 116. As indicated above, proxy retrieval adds a layer of interaction between a playlist subscriber (e.g., an application) and a "baseline" (or unaltered) playlist. In this way, a proxy service prevents direct access of a playlist by a subscriber, thus ensuring that other subscribers may access the playlist and its constituent events in their original forms. One or more operations illustrated in FIG. 3A may be modified, rearranged, or omitted all together. Accordingly, the particular sequence of operations illustrated in FIG. 3A should not be construed as limiting the scope of one or more embodiments.

Figure 3A:
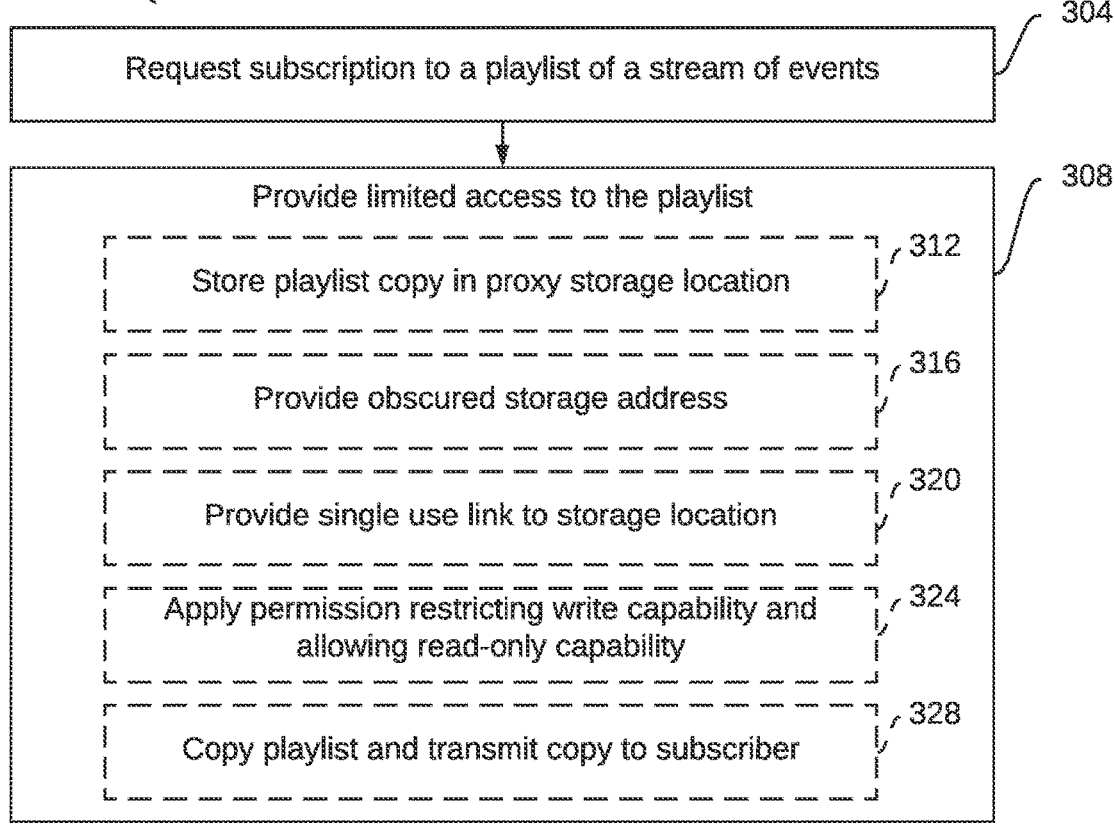
FIG. 3A illustrates an example set of operations in which a proxy service manages a playlist used by a subscriber in accordance with one or more embodiments.

FIG. 3A illustrates an example set of operations, collectively identified as a method 300, for using a proxy service or proxy agent to facilitate indirect access between a subscriber and a playlist. Much like the method 200, the method 300 may begin by the system receiving subscription request for a playlist that is a stream of events (operation 304). The subscription process has been described above in the context of the operation 204, which is applicable to this operation 304.

Upon receipt of the subscription request, the system engages a proxy service to provide limited access to the playlist so that the playlist itself may not be altered by the subscriber (operation 308). Several example techniques for providing limited access to the playlist are presented as optional operations within the operation 308.

In one embodiment, the proxy service may prevent mutation, alteration, or undesired editing of the playlist by copying the playlist and storing the copy of the playlist in a proxy storage location (operation 312). Examples of the proxy storage location include, but are not limited to, a logically separate memory location or data structure that is distinct from the "baseline" instance of the playlist in its original form. The subscriber may access the copy of the playlist in the proxy storage location and either transfer it and/or copy it to a local storage location for processing according to the method 200. Once the proxy service detects access by the subscriber, the proxy service may optionally remove the copy of the playlist in the proxy storage location.

In another embodiment, the proxy service may generate an obscured storage address and provide the obscured storage address to the subscriber (operation 316). In this embodiment, the subscriber may access the baseline playlist and copy it using the obscured storage address. However, because the obscured storage address does not provide a conventionally formatted address (e.g., a memory address, a file path), the subscriber is unable to use the obscured storage address to write changes to the baseline playlist.

In some examples, the obscured storage address may be generated by applying a time-sensitive hash function to the address. In this way, as the applied hash function changes over time, the obscured address provided to the subscriber in the operation 316 will not be properly decoded, thereby preventing the subscriber from accessing the baseline playlist at a later time to write changes to it or otherwise introduce undesired mutations to the playlist.

In another embodiment, the proxy service may generate and provide a single use storage link to a storage location in which the baseline playlist or a copy of the baseline playlist are stored (operation 320). The subscriber may access the baseline playlist using the single use link and copy it. Upon using this single application of the address link, the link expires and the proxy service prevents any further access to the baseline playlist.

In another embodiment, the proxy service may enable a subscriber to access the baseline playlist at will, however the proxy service may use permissions to limit the subscriber to read-only access (operation 324).

In still another embodiment, the proxy service may, upon receiving a subscription request, itself retrieve the playlist and transmit the playlist to an address designated by the subscriber (operation 328).

Any of the preceding operations 312, 316, 320, 324, 328 may be used in any combination with one another. For example, a proxy service may store a copy of the playlist and provide any of an obscured storage address and/or a single use link to the subscriber. In another example, the proxy service may use all five of the operations 312, 316, 320, 324 to enable a subscriber to access a playlist while preventing adulteration of the baseline playlist. In still another embodiment, the proxy service may provide a single use, obscured storage address to the subscriber while also restricting access to read-only. Other combinations and variations of the operations 312, 316, 320, 324, 328 are apparent.

Figure 3B:
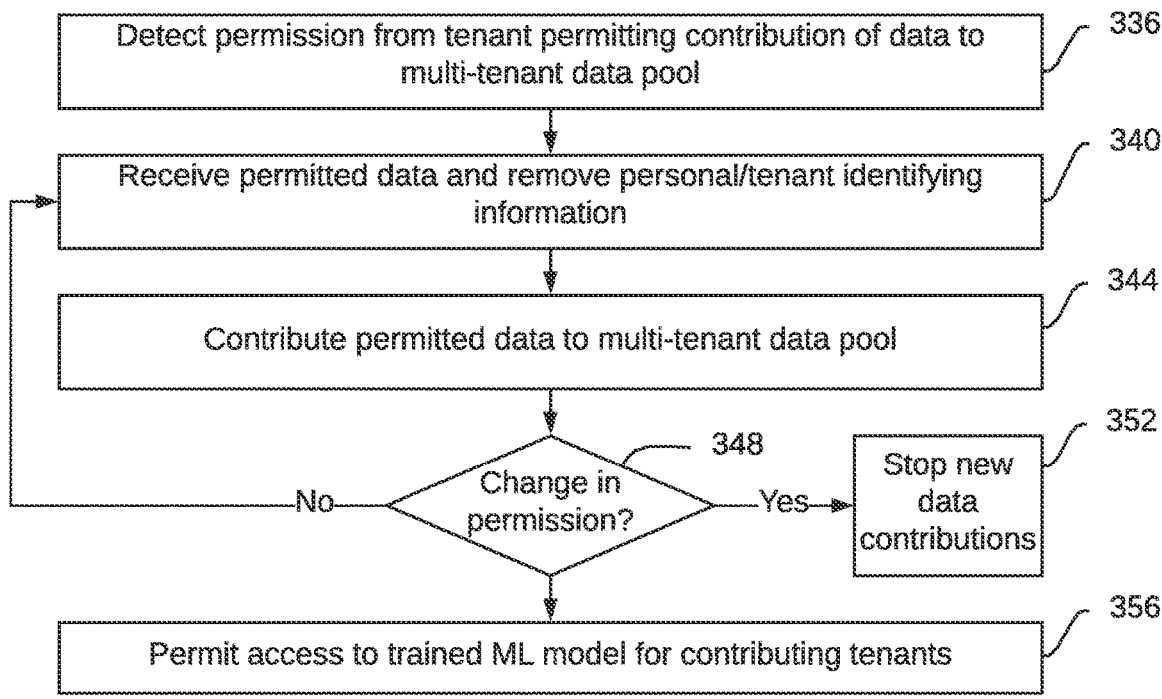
FIG. 3B illustrates an example set of operations for maintaining a current state of permissions that enable or disable playlist sharing across tenancies in a multi-tenant environment in accordance with one or more embodiments.

In an embodiment, the proxy service (instantiated in one embodiment as the retrieval engine 116 illustrated in FIG. 1) may also enable selective pooling of data from different tenants in a multi-tenant environment based on permissions associated with each tenant. Using a proxy service as an intermediate layer between individual tenants and the shared computing functions of the multi-tenant system may help preserve tenant data privacy when desired. A proxy service may also implement example operations, collectively identified as a method 332, used to perform this technique are illustrated in FIG. 3B.

The method 332 begins by the system (e.g., the proxy service) detecting a signal, permission, authorization, or other setting that indicates to the system that a tenant permits data corresponding to the tenant to be contributed to a multi-tenant data resource (or "pool") (operation 336).

A tenant may provide this permission in any of several ways. In some examples, the tenant may grant data sharing permission by setting a permission value in a tenant profile. This setting may be detected by the system and may indicate any extent of contribution of data by the tenant to the data resource pool. In some embodiments, the permission may indicate that certain portions of a file structure may be shared, whether a set of directories (and their contents), a set of sub-directories (in one or more directories), a type of file (e.g., as indicated by a file extension), and the like. In other embodiments, the permission setting may indicate a data item origination date range to identify files to be shared or, conversely, not shared.

In still other embodiments, the tenant permission setting may indicate a blanket contribution policy for some or all data items associate with the tenancy. In other embodiments, the tenant permission setting may permit sharing of data items associated with certain segments of the tenancy. For example, a tenant permission setting may permit sharing of data items generated by certain business units or sub-organizations associated with sub-tenancies within the parent tenancy. Illustrations of these sub-organizations include departments, geographical business divisions and/or product divisions that are sub-units of a corporate organization.

In still other embodiments, the tenant may apply metadata to individual data items that designate whether the data item may be shared (or is prohibited from being shared) with a multi-tenant data pool. In some examples, the tenant may apply the metadata to the data items upon the data item being generated, transmitted, and/or stored.

Regardless of the way in which the sharing permission (or prohibition) is applied, the proxy system may detect the sharing status. One advantage of using an intermediate computing layer (e.g., between a tenant and a commonly accessible resource shared by multiple tenants) is such as a proxy service is that the proxy service may confirm the permitted level of sharing in a distinct environment that is separate from the pooled computing resources. Because the proxy service enforces tenant sharing policies/permissions, data items are less likely to be unintentionally or improperly shared.

Upon detecting that a tenant has permitted contribution of data items to a pooled data resource, the system (i.e., a proxy service) receives permitted data items from the tenant and removes identifying information (operation 340). The identifying information may be personally identifying information that identifies an individual. The identifying information may be tenant identifying information that identifies the contributing tenant. Regardless, one or both of these types of identifying information may be removed by the system. This may be referred to as "anonymizing" the data.

Examples of personally identifying information include, but are not limited to, name, government issued unique identifiers (e.g., social security number, work authorization number, driver's license state and number), address, email address, account name, and the like. Examples of tenant identifying information may include, but are not limited to, entity name, entity address, a government issued tax identifier, and the like.

The system may use one or more different types of trained ML models to identify the identifying information. For examples, trained classifiers, neural networks, or other types of ML models may be trained to identify patterns in alphanumeric characters and/or words that correspond to identifying information.

Once identified, the system may replace the values in a field associated with identifying information with non-identifying information. For example, the system may simply remove the identifying information and/or replace it with no data or content-free data (e.g., punctuation marks, randomly selected alphanumeric characters).

Once the system receives the data, determines whether the data may be contributed to a multi-tenant data pool, and removes identifying information from the data, the system then contributes the data to a multi-tenant data pool (operation 344). In some examples, the system copies the anonymized, shared data to a designated memory partition or memory structure that stores the shared data. In other embodiments, the shared data pool is a construct in which data associated with individual tenants is stored separately but in distinct memory regions that are accessible to all tenants contributing to the shared data pool and systems using the shared data. Pointers and/or addresses may be used to access the shared data as though it were stored in a common location.

For example, a shared data pool may be used to train one or more machine learning models. Thus trained with pooled data, the contributing tenants may use the trained machine learning model for their individual data predictions and analyses. In some examples, the diversity and volume of data in the shared data pool is greater than some or all of the data available to an individual tenant. As a result a machine learning model trained with the shared data pool may be more analytically accurate and/or precise than a model trained with data only from an isolated tenant.

The system may determine whether a tenant has changed a sharing permission status to prevent sharing (operation 348). The system may monitor and detect a change in a profile selection, metadata field value, and the like to determine whether a tenant has changed the extent of sharing.

If the system detects an indication that a tenant no longer wishes to share data via the shared data pool, or has changed a type of data shared, the system stops collecting additional data contributions from the tenant (operation 352). In some embodiments, a change of this type also triggers the system to deny access to any ML models trained using shared data.

In some embodiments, the system also prevents any further access to the previously shared data. For example, the system may prevent further access by other tenants to storage locations for data items associated with the tenant no longer sharing data. In some examples, the system may identify data times associated with the tenant no longer contributing data to the shared data pool using metadata associated with the files (e.g., identifying tenant origin and sharing status) and restrict access to these data items. Regardless of which technique is used (e.g., restriction of a designated mass storage location or restriction on a data item by data item basis using meta data), the system identifies data no longer sharable and limits access to the data.

If the system does not detect changes to the permissions at the operation 348, then the system continues to receive data and remove identifying information (operation 340).

The method 332 may continue with continuing to permit access to trained ML models and/or other data systems for those tenants contributing data to the shared data pool (operation 356).

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 4 illustrates an example system 400 that includes a playlist subscriber 404, a playlist subscriber 408, an optional proxy agent 412, and a playlist manager 416.

The playlist manager 416 stores playlists 420 and 436. The playlist 420 includes events 424, 428, and 432. The playlist 436 includes events 440, 444, and 448. The playlist manager also includes a data structure of playlist subscriptions 452.

The playlists 420 and 436 and their corresponding events are analogous to those described above. In this example, the playlists 420 and 436 are the "baseline" or "original" playlists that are provided to subscribers and are preserved in their original states.

As described above, other elements of the system 400 prevent alteration or modification of the playlists 420 and 436 and their corresponding events by the subscribers 404 and 408. More specifically, the proxy agent 412 may be used by the system 400 to preserve playlists stored within the playlist manager 416 in their original forms. The proxy agent 412 may use any of the techniques described above in the context of FIG. 3A.

The playlist subscriptions 452 data structure stores, in one example, identities of subscribers and the identities of the playlists to which the subscribers are subscribed. In this way, the playlist manager 416 may coordinate the transfer of changes, additions, and/or updates to the playlists to their respective suppliers.

Furthermore, the playlist subscriptions 452 data structure may optionally store tenant permissions that may be used to share data across tenants in a pooled data arrangement as described above in the context of FIG. 3B.

Turing now to the playlist subscribers, FIG. 4 illustrates that playlist subscriber 404 subscribes to playlist 420 and playlist subscriber 408 subscribes to playlist 436. However, as also shown, both of these playlists, or rather their locally stored, "merged" versions 420' and 436' have been modified by their respective subscribers, leaving the baseline playlists stored in the playlist manager 416 unaltered.

More specifically, the locally stored playlist 420' has been altered by duplicating the event 424. The duplicated instance of event 424, indicated as 424' in FIG. 4, is stored locally in association with the subscriber 404. This duplicated instance 424' is shown as appended to a terminal end of locally stored playlist 420'. This illustration corresponds to the example presented above in which the duplicated instance of the event 424' essentially enables another attempt at executing the event 424.

The playlist 436', locally stored in the subscriber 408, illustrates a different type of modification than that illustrated in the context of the playlist 420'. In this situation, a locally stored event 450 that is different from any of the other events in the playlist 436' has been inserted between existing playlist events 444 and 448. This illustrates that not only may a new event, distinction from any pre-existing events in the playlist, be added to a playlist, but also that the event may be added between existing events and not only appended to a terminal end of a playlist.

The subscribers 404, 408 also include tenant profiles 406, 410, respectively. The system, and more specifically the proxy agent 412, may use tenant profiles 406, 410 to detect whether data is to be shared between tenants in a shared data pool, as described above in the context of FIG. 3B. Similarly, the tenant profiles 406, 410 may indicate to the proxy agent 412 which types of data/data sources are to be shared.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
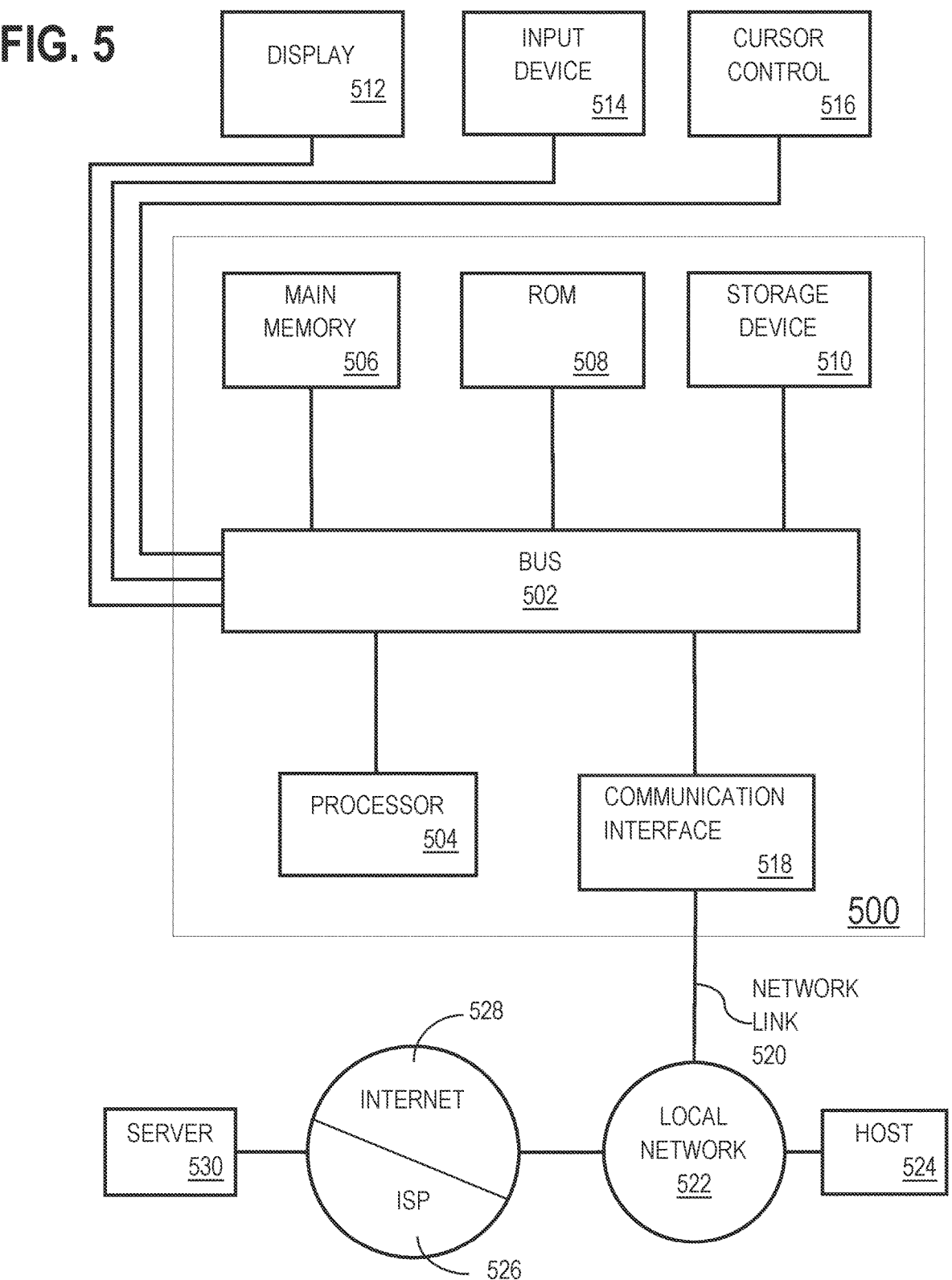
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   requesting a subscription to a first playlist comprising a first stream of events;
   receiving the first stream of events corresponding to the first playlist;
   storing a local copy of the first playlist;
   executing the local copy of the first playlist by executing events in the first stream of events;
   merging the first playlist with locally selected events to generate a merged stream of events at least by:
      identifying a first event, in the first stream of events, that has been locally executed;
      determining that the first event needs to be locally re-executed;
      inserting a new instance of the first event in the local copy of the first playlist between a second event received in the first stream of events and a third event received in the first stream of events; and
   executing the merged stream of events.

2. The media of claim 1, wherein merging the first playlist with locally selected events to generate the merged stream of events does not effect (a) publication of the first playlist by a playlist publisher or (b) a second copy of the first playlist obtained by another entity.

3. The media of claim 1, further comprising publishing the merged stream of events as a second playlist.

4. The media of claim 1, further comprising a first tenant and a second tenant in communication with a publisher of the first playlist, wherein one or both of the first tenant and the second tenant execute the requesting operation.

5. The media of claim 1, wherein:
   the requesting operation is received from a first tenant via a proxy service in communication with a playlist publisher that is configured to respond to playlist subscription requests; and
   the receiving operation further comprises receiving the first playlist from the proxy service.

6. The media of claim 5, wherein, prior to receiving the first playlist, a permission level sufficient to access the first playlist is transmitted to the proxy service.

7. The media of claim 5, wherein receiving the first playlist from the proxy service further comprises receiving access to the first playlist while not receiving one or both of a storage location of the first playlist or write permission for editing the first playlist.

8. A method comprising:
requesting a subscription to a first playlist comprising a first stream of events;
receiving the first stream of events corresponding to the first playlist;
storing a local copy of the first playlist;
executing the local copy of the first playlist by executing events in the first stream of events;
merging the first playlist with locally selected events to generate a merged stream of events at least by:
identifying a first event, in the first stream of events, that has been locally executed;
determining that the first event needs to be locally re-executed;
inserting a new instance of the first event in the local copy of the first playlist between a second event received in the first stream of events and a third event received in the first stream of events; and
executing the merged stream of events.

9. The method of claim 8, wherein merging the first playlist with locally selected events to generate the merged stream of events does not effect (a) publication of the first playlist by a playlist publisher or (b) a second copy of the first playlist obtained by another entity.

10. The method of claim 8, further comprising publishing the merged stream of events as a second playlist.

11. The method of claim 8, further comprising a first tenant and a second tenant in communication with a publisher of the first playlist, wherein one or both of the first tenant and the second tenant execute the requesting operation.

12. The method of claim 8, wherein:
the requesting operation is received from a first tenant via a proxy service in communication with a playlist publisher that is configured to respond to playlist subscription requests; and
the receiving operation further comprises receiving the first playlist from the proxy service.

13. The method of claim 12, wherein, prior to receiving the first playlist, a permission level sufficient to access the first playlist is transmitted to the proxy service.

14. The method of claim 12, wherein receiving the first playlist from the proxy service further comprises receiving access to the first playlist while not receiving one or both of a storage location of the first playlist or write permission for editing the first playlist.

15. A system comprising:
at least one device including a hardware processor;
the system being configured to perform operations comprising:
requesting a subscription to a first playlist comprising a first stream of events;
receiving the first stream of events corresponding to the first playlist;
storing a local copy of the first playlist;
executing the local copy of the first playlist by executing events in the first stream of events;
merging the first playlist with locally selected events to generate a merged stream of events at least by:
identifying a first event, in the first stream of events, that has been locally executed;
determining that the first event needs to be locally re-executed;
inserting a new instance of the first event in the local copy of the first playlist between a second event received in the first stream of events and a third event received in the first stream of events; and
executing the merged stream of events.

16. The system of claim 15, wherein merging the first playlist with locally selected events to generate the merged stream of events does not effect (a) publication of the first playlist by a playlist publisher or (b) a second copy of the first playlist obtained by another entity.

17. The system of claim 15, further comprising publishing the merged stream of events as a second playlist.

18. The system of claim 15, further comprising a first tenant and a second tenant in communication with a publisher of the first playlist, wherein one or both of the first tenant and the second tenant execute the requesting operation.

19. The system of claim 15, wherein:
the requesting operation is received from a first tenant via a proxy service in communication with a playlist publisher that is configured to respond to playlist subscription requests; and
the receiving operation further comprises receiving the first playlist from the proxy service.

20. The system of claim 19, wherein, prior to receiving the first playlist, a permission level sufficient to access the first playlist is transmitted to the proxy service.

21. The system of claim 19, wherein receiving the first playlist from the proxy service further comprises receiving access to the first playlist while not receiving one or both of a storage location of the first playlist or write permission for editing the first playlist.

\* \* \* \* \*